United States Patent [19]

Daspit

[11] 4,096,886
[45] Jun. 27, 1978

[54] CLAMP FOR REPAIR OF LEAKING UNDERWATER PIPELINES

[76] Inventor: Ronald Albert Daspit, 2401 Delille St., Chalmette, La. 70043

[21] Appl. No.: 784,340

[22] Filed: May 2, 1977

[51] Int. Cl.² .............................................. F16L 55/16
[52] U.S. Cl. ........................................................ 138/99
[58] Field of Search .................... 138/97, 99; 285/45, 285/373, 419

[56] References Cited

U.S. PATENT DOCUMENTS

| 518,805 | 4/1894 | Cooper | 138/99 |
| 797,914 | 8/1905 | Rochat | 138/99 X |
| 2,094,258 | 9/1937 | Thompson | 138/99 |
| 2,286,751 | 6/1942 | Merrill | 138/99 |
| 2,759,493 | 8/1956 | Risley et al. | 138/99 |
| 2,787,051 | 4/1957 | Risley | 138/99 X |
| 2,862,736 | 12/1958 | Russell | 277/169 |
| 3,396,753 | 8/1968 | Foster et al. | 138/99 |
| 3,861,422 | 1/1975 | Christie | 138/99 |

OTHER PUBLICATIONS

M. B. Skinner, Catalog Number 36, 1/1937, pp. 12 & 13.

Primary Examiner—Charles E. Phillips
Attorney, Agent, or Firm—Charles Richard Werner

[57] ABSTRACT

A clamp for the permanent repair of leaking underwater pipelines providing improved sealing qualities against high pressures, as well as a feature which is designed to decrease the erosion of submerged pipelines which are subjected to erosive action of abrasive materials such as sand, fine gravel or silt in motion and providing for relatively easy and rapid installation under adverse diving conditions.

1 Claim, 6 Drawing Figures

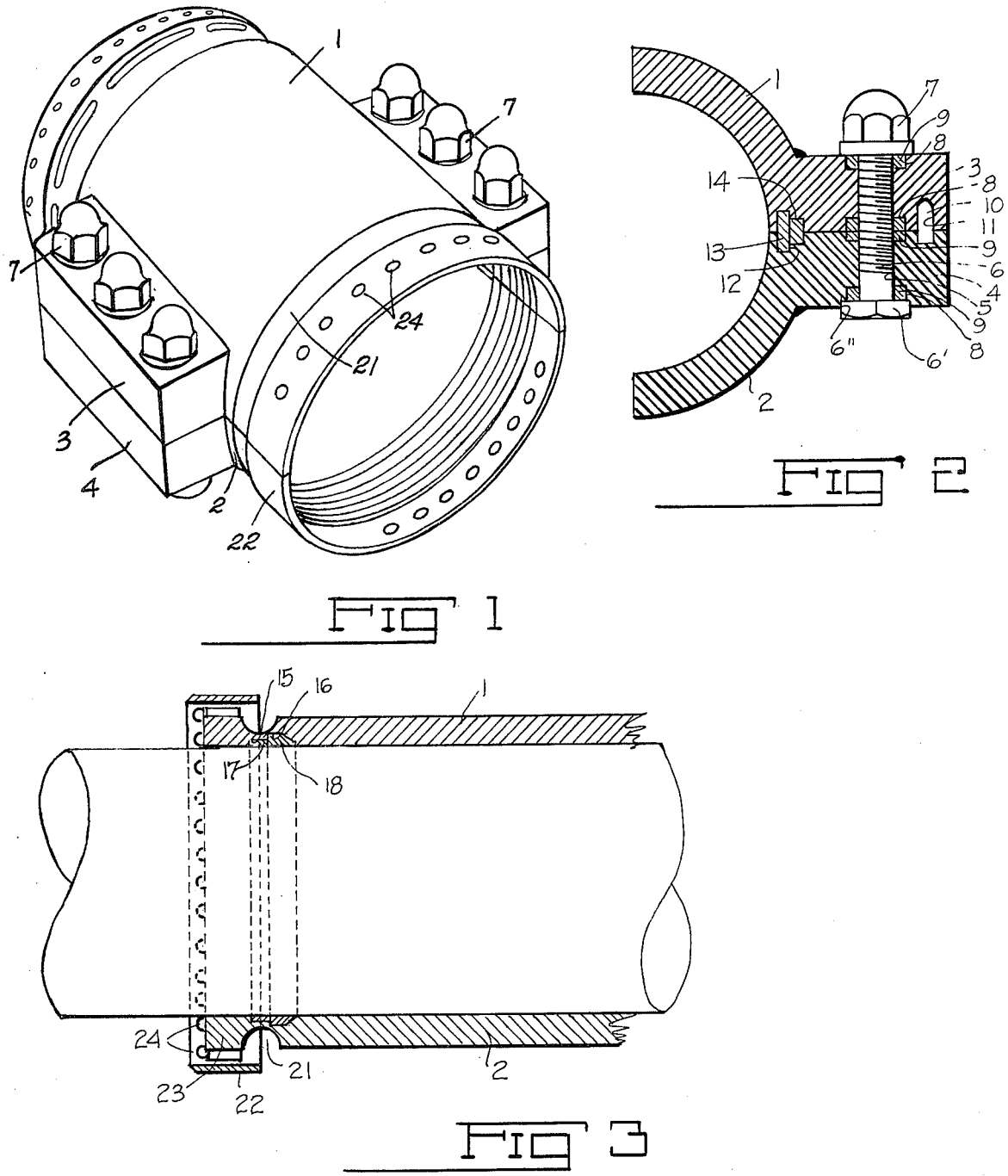

CLAMP FOR REPAIR OF LEAKING UNDERWATER PIPELINES

BRIEF SUMMARY OF THE INVENTION

Underwater oil exploitation has made necessary the development of new apparatus and techniques, among one of the important ones, being the repair of leaks in said pipelines. When such leaks occur they must be quickly located and repaired to minimize the contamination of the water in which the pipeline rests.

The clamp must be so designed and constructed that it will facilitate its placement and will provide a positive seal against leakage under high pressure in order to prevent contamination of the water from oil leakage.

Underwater pipeline construction and repair work is extremely costly and it is one of the fundamental objectives in this art to be able to achieve such construction work and repairs with the least possible passage of time in order to minimize cost and losses. That is one of the primary reasons for the design and construction of tools, equipment and devices which will facilitate the rapidity of the work and yet provide maximum safety and permanence in the assembly and function of the installation at the minimum cost.

Obviously, a tight seal between joints of pipe is a definite requirement to prevent leakage and contamination as previously indicated.

It has been found that in many instances the abrasive effect of sand, silt and the like activated by moving currents of the water rapidly wears out couplers and clamps and for this reason I have incorporated in the design of my invention a feature which will minimize such abrasive action and subsequent erosion.

It is understood that there exists in the prior art many types of couplers and clamps for emergency, temporary and/or permanent repair of pipelines, varying in complexity from very simple to some which are most complex and costly. The majority of these are designed to be applied where normal visibility and accessability are present. Insofar as I am aware there does not exist any coupler or clamp which is of the same construction and design as that to be described and claimed in the foregoing specification. My invention is the result of years of actual experience in the business of underwater pipeline repair and installation and a thorough knowledge of what exists in the art insofar as what has been commercially available through the years.

The clamp comprising my invention is not normally for use above water but is designed primarily for underwater installation under extremely adverse conditions at great depths with little or no visibility, so that it can be installed in the shortest time and operate efficiently and dependably in sealing a leaking pipeline.

Furthermore the specific design of the clamp is such that superior sealing qualities are achieved against higher pressures than is possible with present day clamps available on the market. My clamp eliminates the causes of failure of presently available clamps due to corrosion, since it is not affected by the cathodic conditions which cause such corrosion.

Excellent sealing capabilities of my clamp against higher pressures are achieved by use of solid faced gaskets recessed and compressed in machined grooves provided for same, thus leaving only four points of intersection which are overlapped as well as butted one against the other.

Due to the fact that in many bodies of water strong currents exist, and together with sand, abrasive silt and fine gravel cause considerable damage to pipelines, particularly at junctures of clamps or river weights, my clamp is so designed as to minimize such erosion effect by deflecting and interrupting the water and flow of abrasive material diminishing or eliminating completely this damage and pipe failure caused by this phenomenon.

DESCRIPTION OF THE DRAWINGS

FIG. 1 is an isometric view of the clamp comprising my invention.

FIG. 2 is a partial sectional view through the clamp showing the various gaskets and seals and clamping flanges and fastening members.

FIG. 3 is a longitudinal fragmentary view of a portion of a pipeline and a sectional view of a portion of the clamping member showing the details of the erosion preventing construction.

DETAILED DESCRIPTION OF THE DRAWINGS

Figure 4:
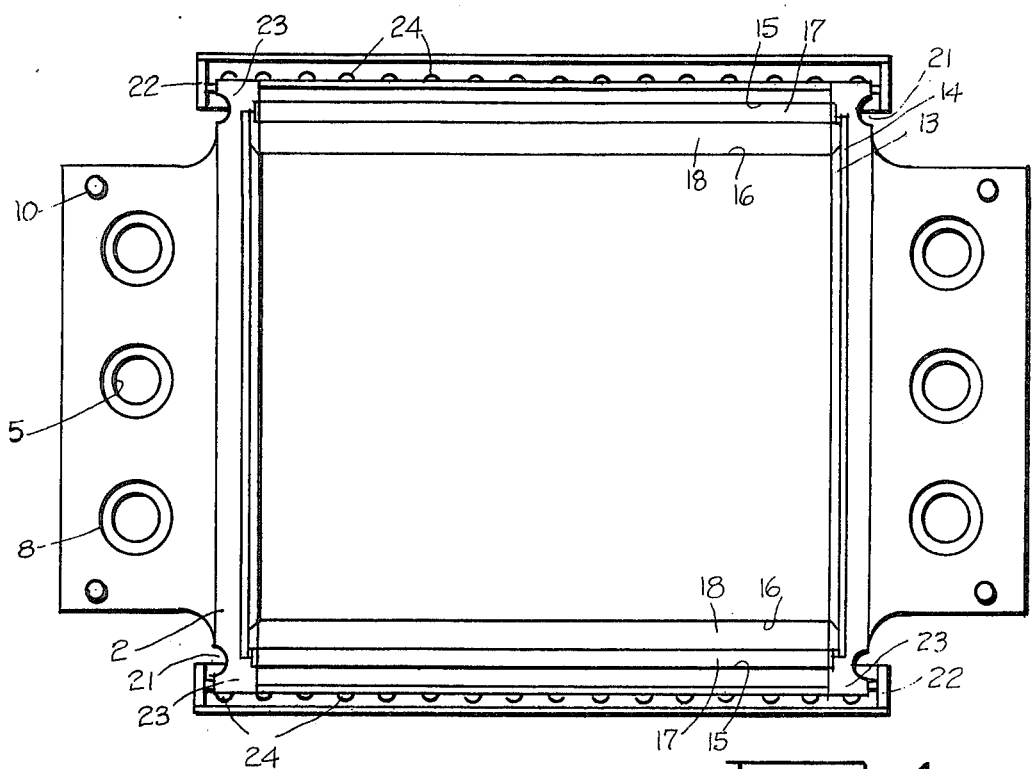
FIG. 4 is a plan view of one half of the clamping member showing additional details of the erosion reducing construction.

Referring now to the drawings by numerals of reference 1 and 2 designate upper and lower halves of a clamp, each substantially semicircular in form and of longitudinal configuration having lateral flanges 3 and 4 with apertures 5 through which suitable fastening members 6 may extend and be held by acorn nuts 7.

Recesses 8 are provided at the ends of the apertures 5 in which suitable gaskets 9 may be placed thus providing for leakproof connection wherever the fastening members 6 are used.

To aid in the proper alignment of the two halves 1 and 2 of the clamp, pins 10 in flange 2 and matching apertures 11 in flange 1 are provided. The heads 6' of fastening members 6 may be received in milled recesses 6'' in the lower flange 2 to prevent the bolts from turning.

Positioned in stepped recesses 12 or slots in the clamp halves are longitudinal seals or gaskets 13 and 14, the latter being preferably of a harder durometer than and butting against the gasket 13.

Figure 5:
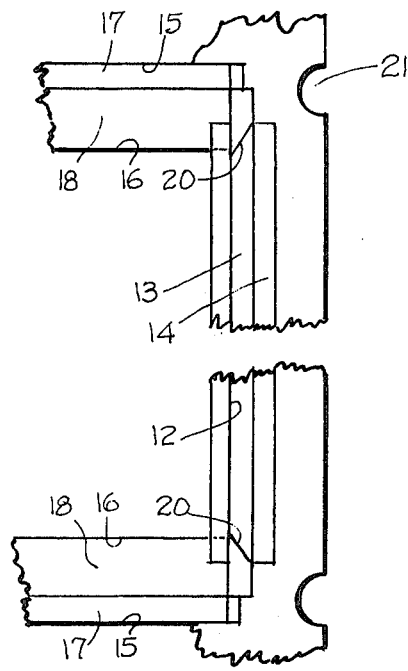
FIG. 5 is a fragmentary detail view of the special gasket construction which enhances the sealing qualities of the invention.
Figure 6:
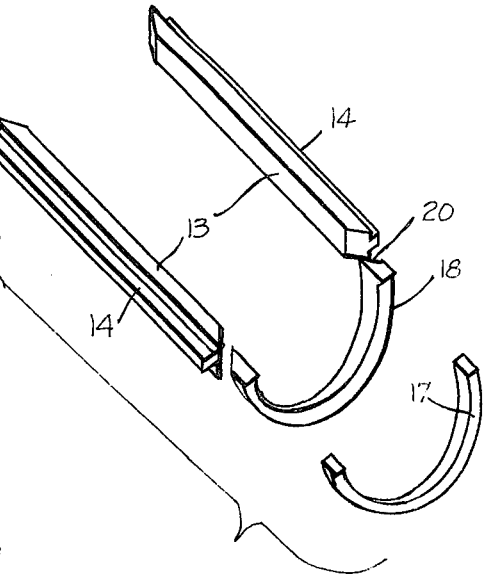
FIG. 6 is an isometric view of the gasket arrangement with certain parts disassociated from others for clarity of illustration.

Annular internal grooves 15 and 16 are provided adjacent the ends of the coupler, and inserted snugly within these grooves are sealing segments 17 and 18. The segments 18 are angularly formed at one side as indicated at 19 to enhance the sealing qualities and better resist any fluid leakage at this point. In the side view shown in FIG. 5 it will be seen that seals 18 are beveled as at 20 and this also is an important feature inasmuch it is believed that this enhances the sealing function at the juncture of the two sealing segments 18 with the backup seals 17 forced by compression against the sealing segments 18.

These two longitudinal gaskets or seals 13 and 14 are cemented together and then cemented into the stepped recesses 12 in one of the flange faces. When the two clamp halves are assembled the longitudinal gaskets 13 and 14 and the annular gaskets or seals 17 and 18 are introduced into their respective recesses or interfaces simultaneously. Thus introduced in the machined recesses the gaskets present one solid face to internal pressure as opposed to use of two separate gaskets compressed one against the other, minimizing gasket failure at their juncture.

Use of the gaskets in this manner electrically insulate the clamp from the pipe and use of dowel pins in aligned apertures assure alignment of the two clamp halves, whereby the diagonally cut gaskets will match correctly and be compressed into proper sealing position.

The feature of my invention which is utilized to reduce to a minimum the erosive effect of water currents mixed with sand, gravel or other abrasive materials will be evident by the following description in which the ends of the clamp halves are extended and are provided with semicircular grooves 21 outwardly of which is located a shroud 22 attached to the ends of the clamp halves by spaced ribs 23 and outwardly from said ribs are a plurality of spaced apertures 24, the entire design being such that the flow of water passing at these ends of the coupler being diffused considerably in order to eliminate or at least to greatly minimize the erosion normally caused by continuous passage of sand and gravel laden currents.

From the foregoing many advantages are apparent, among which are: prevention of corrosion of bolts by use of gaskets and acorn nuts to prevent entry of water to the bolts; use of dowel pins and aligning apertures to assure correct and safe assembly where visibility is limited or zero, by safe being meant zero possibility of misalignment or displacement of or damage to gaskets or seals during assembly.

The halves of the seals cannot be installed in reverse or at an angle to the pipe nor can be gaskets be cut or damaged without the knowledge of the diver.

By cementing the longitudinal gaskets in correct position in the machined grooves on one half of the clamp their correct relationship to the other half of the clamp as well as to the annular seals or gaskets is assured.

The intersection of the annular gasket is accomplished by having the interface of the innermost gasket 18 cut on a diagonal 20 with the longitudinal plane of the clamp and backed by a wider and firmer gasket 17 with no diagonal interface which butts against the face of the opposing gasket located longitudinally of the pipe held by the clamp.

What I claim as new and desire to secure by Letters Patent is:

1. A clamp for repair of leaking underwater pipelines employing two matching semicircular segments with longitudinal flanges on each segment and fastening means passing through apertures in said segments to secure them together, aligning slots in each opposing faces of the segments, elongated seals in said slots, annular seals at the ends of the segments, adapted to seal the clamp against leakage from the pipe on which it is mounted and circular grooves adjacent the ends of the clamp, externally thereof, a shroud spaced from the circular grooves and extending to the end of the clamp at each end thereof, a plurality of ribs supporting the shroud to the clamp, and a plurality of apertures spaced about the periphery of the shroud for passage of liquid therethrough.

* * * * *